US006189217B1

(12) United States Patent
Melvin et al.

(10) Patent No.: US 6,189,217 B1
(45) Date of Patent: Feb. 20, 2001

(54) POWER SAW HAVING BLADE STORAGE CHAMBER

(75) Inventors: Jason R. Melvin, Towson; Benjamin J. Grabowski, Baltimore; Gregory A. Rice, Aberdeen, all of MD (US)

(73) Assignee: Black & Decker Inc., Newark, DE (US)

(*) Notice: Under 35 U.S.C. 154(b), the term of this patent shall be extended for 0 days.

(21) Appl. No.: 09/261,319

(22) Filed: Mar. 3, 1999

Related U.S. Application Data

(63) Continuation-in-part of application No. 09/098,825, filed on Jun. 17, 1998.

(51) Int. Cl.⁷ .................................................. B26B 3/00
(52) U.S. Cl. .......................... 30/125; 30/392; 81/177.4; 81/490
(58) Field of Search .................. 30/125, 392; 81/490, 81/177.4

(56) References Cited

U.S. PATENT DOCUMENTS

| | | | |
|---|---|---|---|
| 1,371,350 | * 3/1921 | Campbell | 81/177.4 |
| 1,421,792 | * 7/1922 | Linden | 81/177.4 |
| 3,353,573 | 11/1967 | Hitzeroth . | |
| 3,593,417 | 7/1971 | West . | |
| 4,614,037 | 9/1986 | Somers . | |
| 4,779,493 | * 10/1988 | White | 81/177.4 |
| 4,926,721 | * 5/1990 | Hsiao | 81/177.4 |
| 5,230,261 | 7/1993 | Akazawa et al. . | |
| 5,701,675 | 12/1997 | Hall et al. . | |

FOREIGN PATENT DOCUMENTS

| | | |
|---|---|---|
| 28 49 871 | 5/1980 | (DE) . |
| 42 06 099 C2 | 9/1992 | (DE) . |
| 296 20 470 U1 | 5/1997 | (DE) . |
| WO 96/05013 | 2/1996 | (WO) . |

* cited by examiner

*Primary Examiner*—M. Rachuba
*Assistant Examiner*—Sean Pryor
(74) *Attorney, Agent, or Firm*—Harness, Dickey & Pierce, P.L.C.

(57) ABSTRACT

A hand-held power saw (10) having a housing (112) which includes a blade storage chamber (124) and a retaining member (130) for holding at least one spare saw blade (26) within the storage chamber. In one embodiment the retaining member comprises a rubber component having a pair of arms (136). Each arm has a groove (138) formed therein which holds a ball bearing (140). The ball bearings are biased into contact with one another once the retaining member is assembled into a housing portion of the tool within the storage chamber. When a spare saw blade is inserted into the storage chamber a portion thereof is urged between the ball bearings. The resiliency of the rubber arms causes the ball bearings to grasp the spare saw blade and retain it within the storage chamber. The opposite end of the blade engages a foam-like member (150) held within a recess (124c) at the opposite end of the storage chamber which prevents the blade from rattling within the chamber. In alternative embodiments a pivotably mounted retaining member (30) is disclosed which operates in cooperation with an independent clip (32) to retain a spare saw blade in the storage compartment. The various embodiments enable a spare saw blade to be accessed without any external tools and without any separate cover members needing to be removed from the power tool housing.

23 Claims, 8 Drawing Sheets

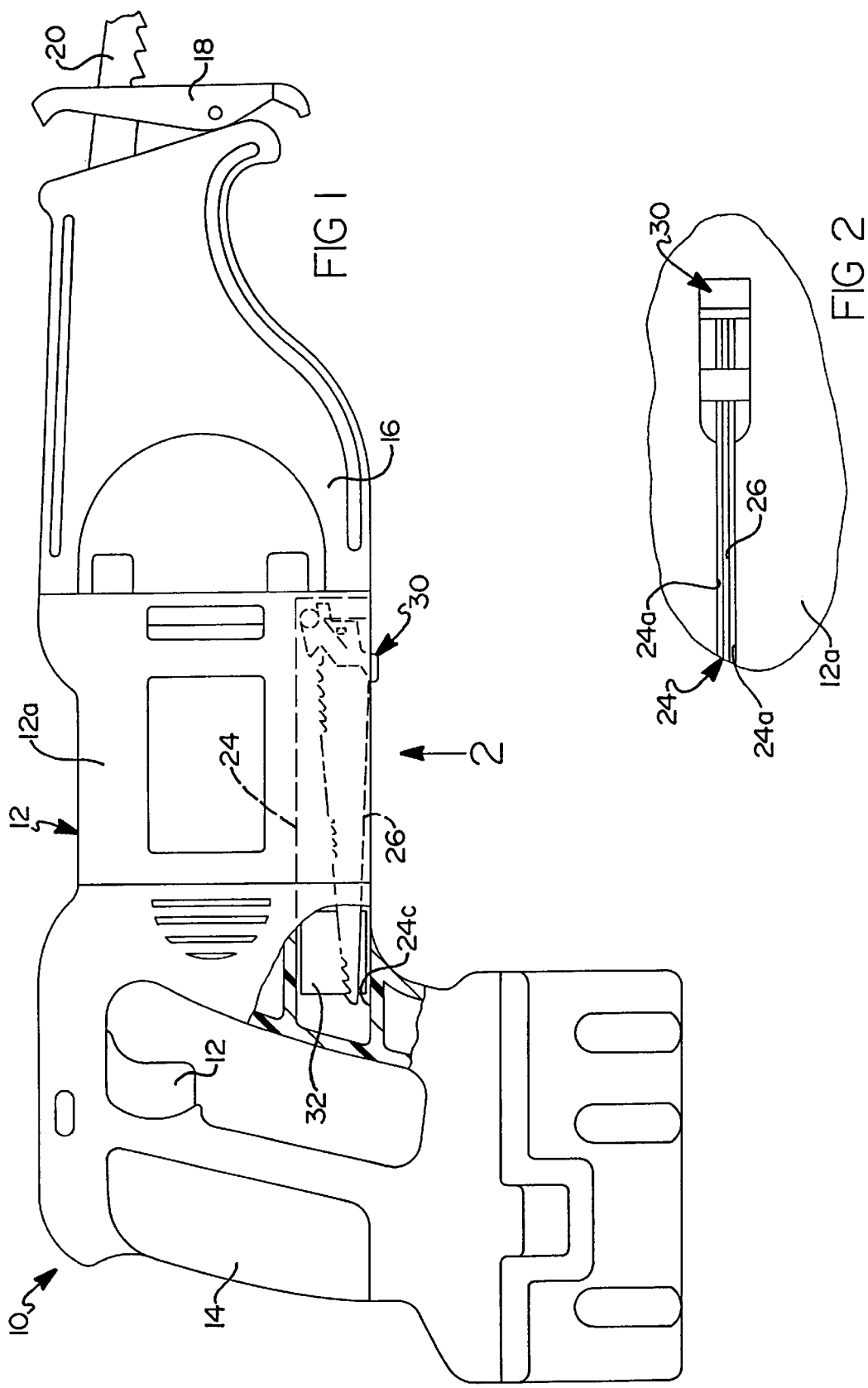

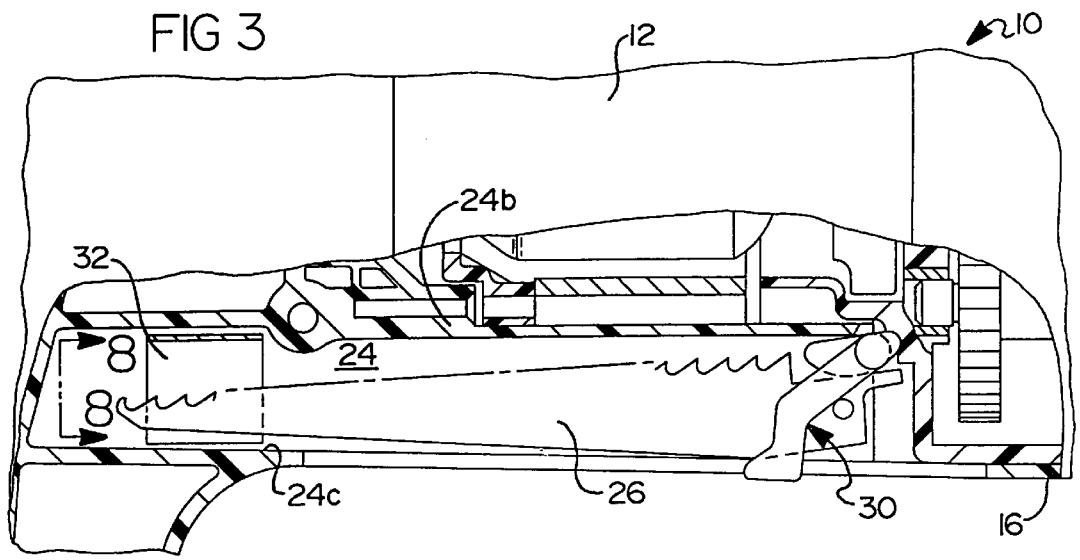
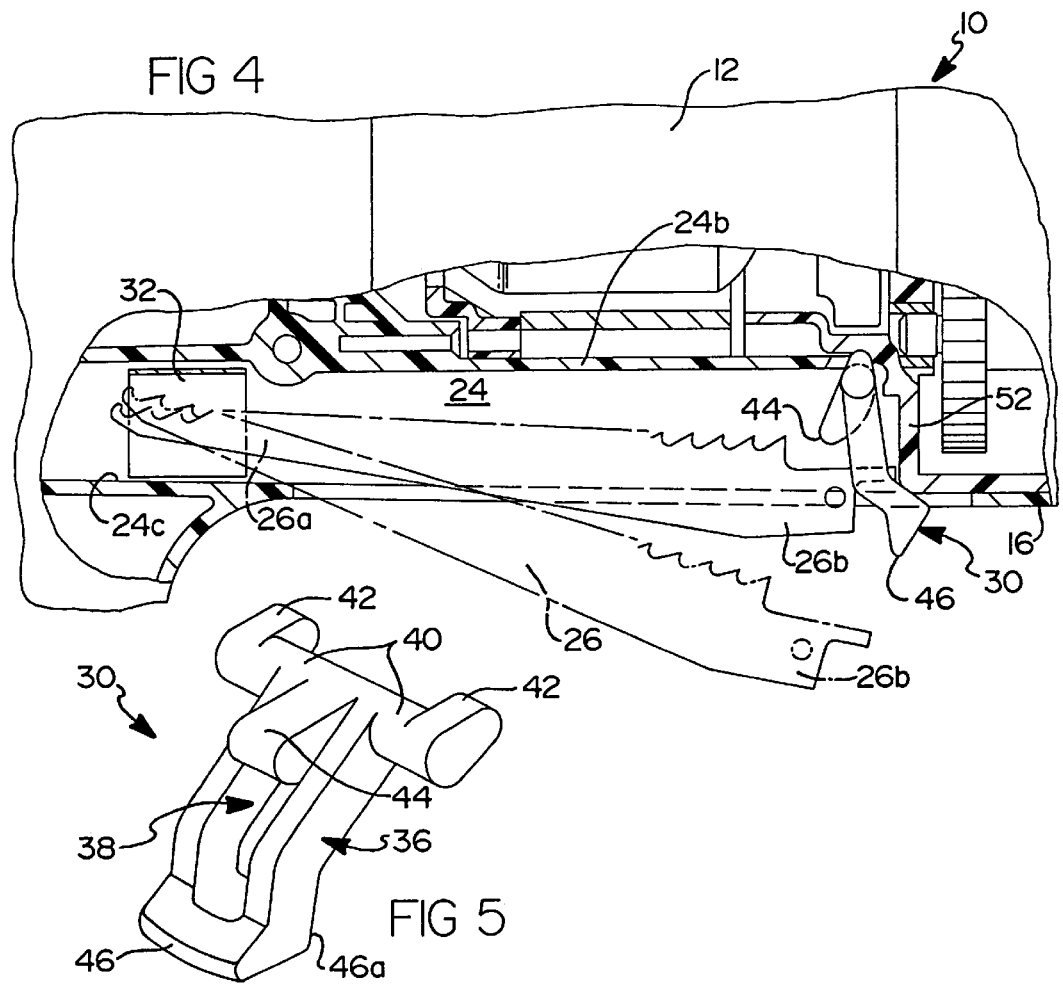

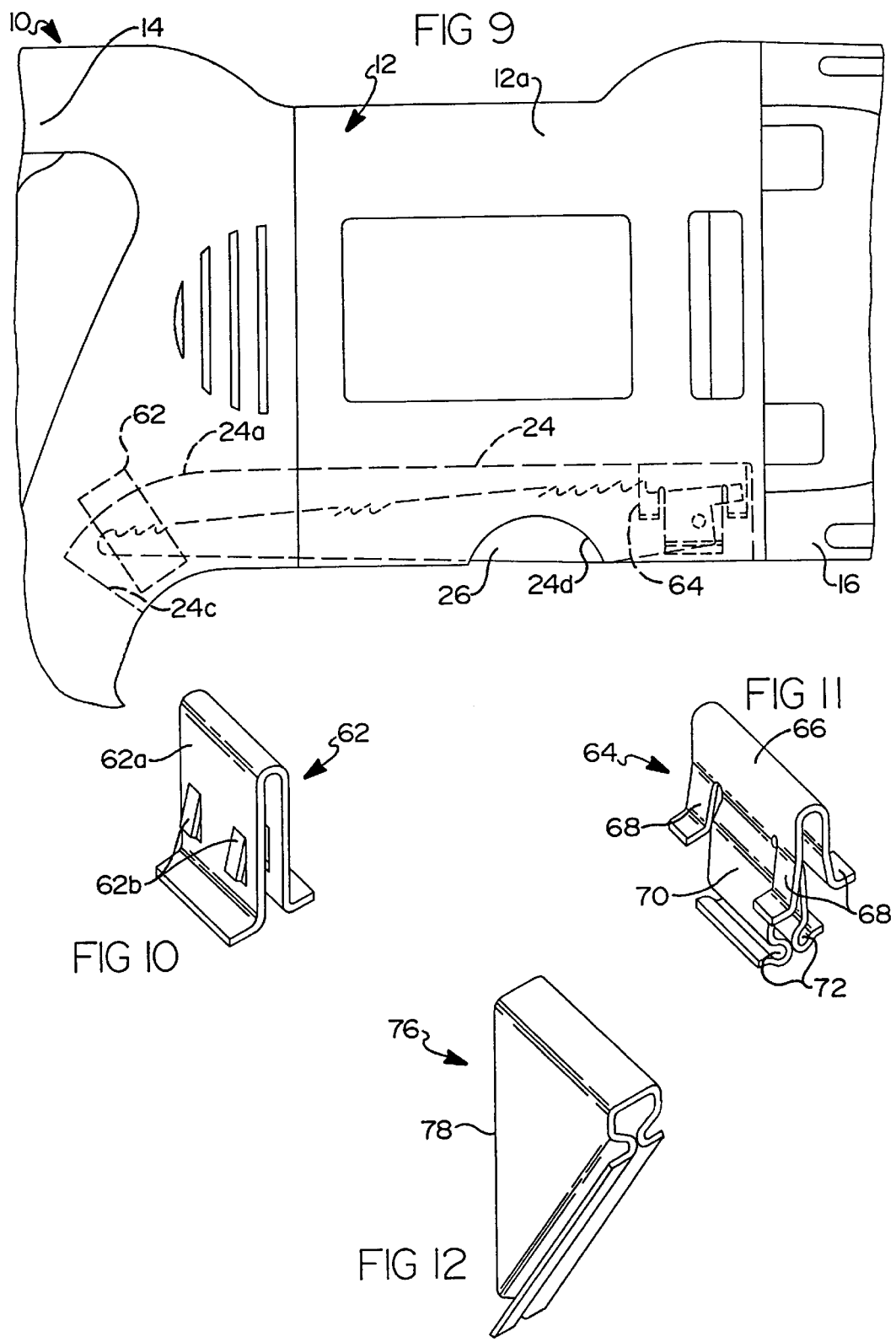

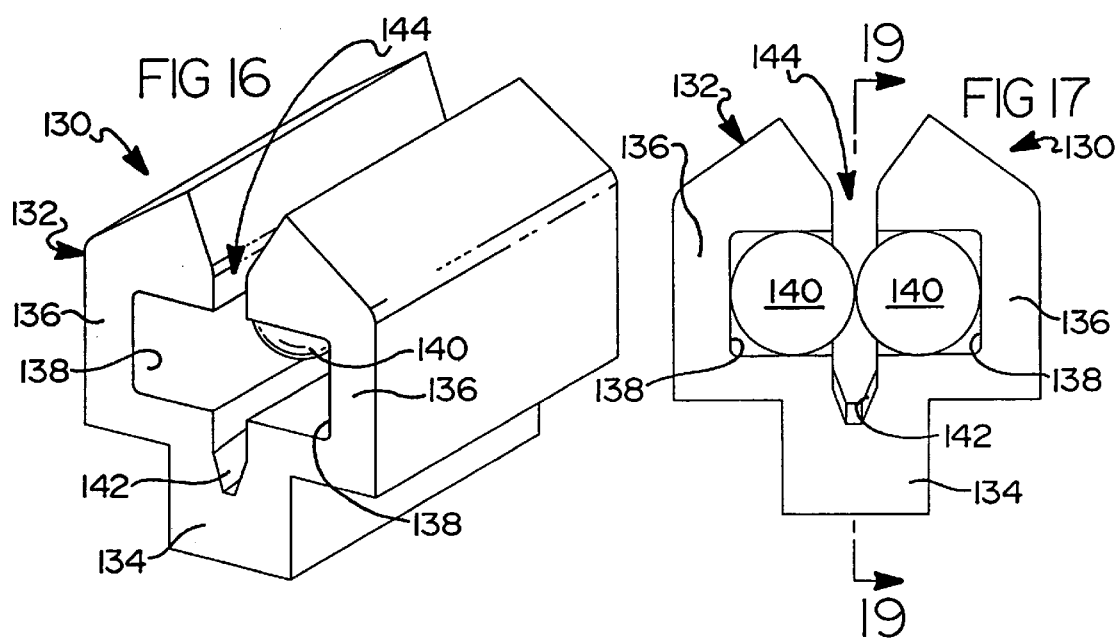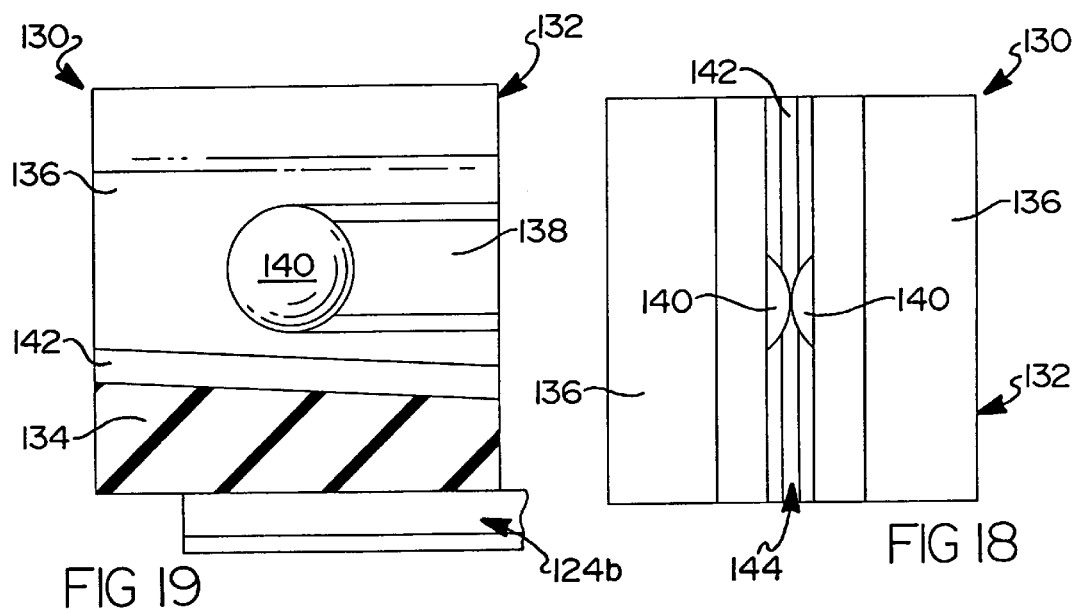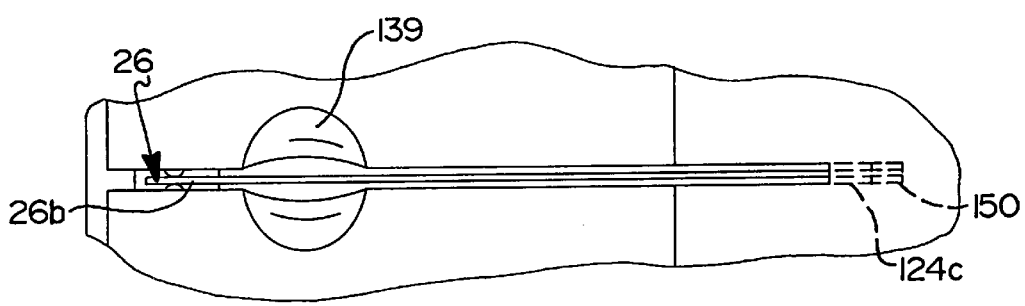

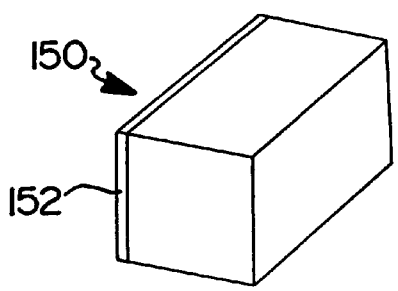
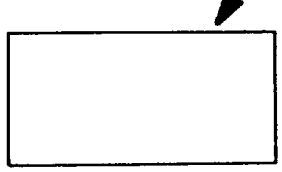
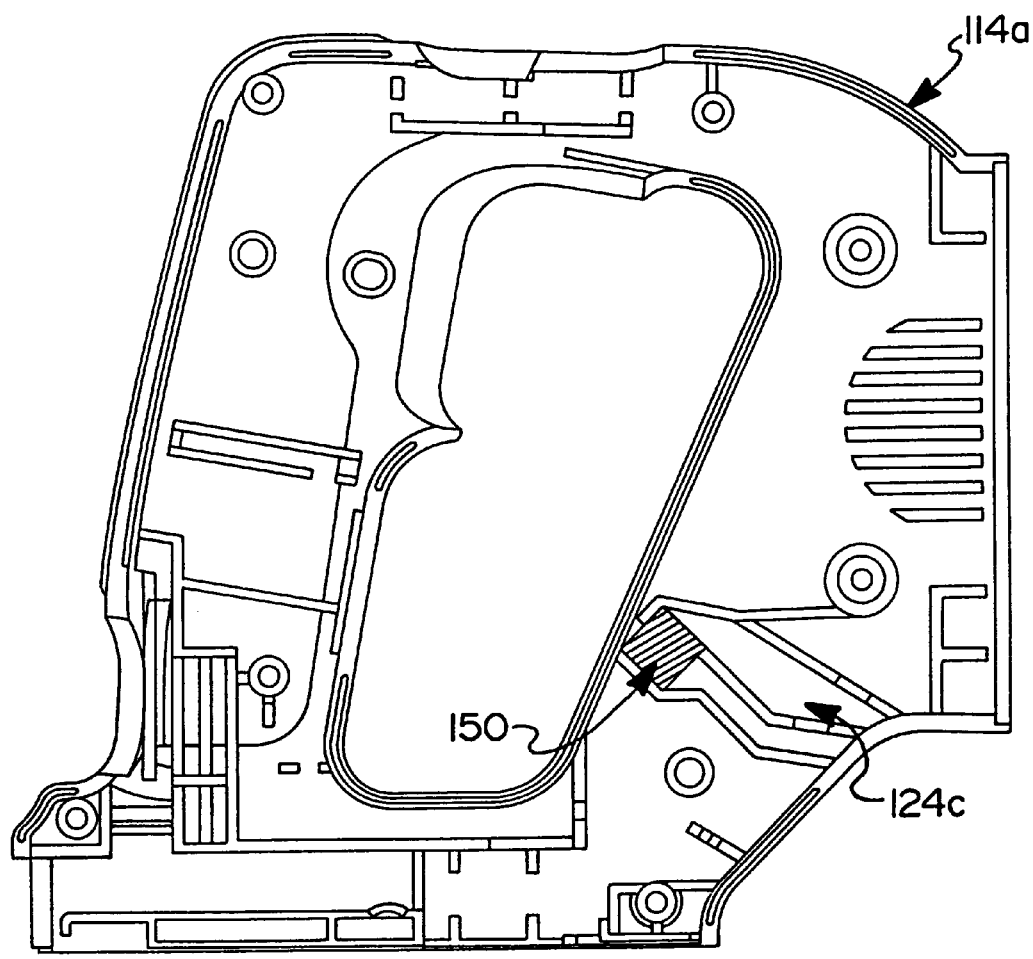

POWER SAW HAVING BLADE STORAGE CHAMBER

CROSS REFERENCE TO RELATED APPLICATION

This application is a continuation-in-part of U.S. application Ser. No. 09/098,825, filed Jun. 17, 1998, presently pending.

BACKGROUND OF THE INVENTION

1. Technical Field

This invention relates to power-driven cutting implements, and more particularly to an electrically powered, hand-held saw having a spare blade storage compartment for holding one or more spare saw blades.

2. Discussion

Electrically driven cutting implements such as jigsaws and reciprocating saws are commonly used for a variety of cutting tasks by both professional builders and construction persons, as well as by individuals involved in home repair and improvement. Reciprocating saws are generally referred to in the trade as "recip" saws and incorporate reciprocating shafts for driving elongated saw blades linearly along a predetermined path to provide either a rectilinear or orbital cutting action.

With a reciprocating saw, the saw blade used is releasably attached to a reciprocating drive shaft. The reciprocating drive shaft is driven by a suitable gear train, which is in turn driven by an electric motor. The blade is typically attached to a blade holder incorporating a set screw which is received in a hole in one end of the saw blade.

Since the saw blade may periodically break, become dull or otherwise need to be replaced, it is necessary to maintain one or more spare saw blades in the event of breakage of a blade in the middle of a cutting task. This has involved professionals and non-professionals either trying to keep one or more spare saw blades in a tool box which is also taken with the saw to a work site. As can be appreciated, it is often inconvenient when a blade becomes dull or in need of replacement, or when the blade needs to be changed for a different application, to be required to put the saw down and retrieve a spare blade from a tool box, a work vehicle, etc. While some individuals attempt to eliminate this inconvenience by carrying one or more spares within some form of blade holder container in a pants pocket or tool box pouch, this too has limitations because it requires the individual to remember to bring the spare blade(s) apart from the saw and to return the spare blades to a tool box after a task is finished.

Other attempts to alleviate the necessity of remembering to carry one or more spare saw blades have involved actually taping the blade to the housing of the saw. This is disadvantageous for several reasons. For one, the tape used may not be easily removable. For another, the tape may cover one or more openings formed in the housing for supplying air circulation to the internally mounted motor of the saw. Accordingly, it is strongly preferable to be able to carry at least one spare saw blade on the housing of the saw itself without the risk of the saw blade being accidentally dislodged from the housing and without the use of tape to secure the saw blade to the housing.

Various attempts have been made to modify a housing of a power tool to accommodate one or more spare implements such as saw blades. These attempts have involved forming a compartment in a housing of a power tool within which one or more cutting implements can be held therein by a removable, independent cover member secured to the housing either with or without separate threaded screws. An example of such an arrangement is shown in U.S. Pat. No. 3,353,573 to Hitzeroth. The obvious drawback with this arrangement is the possibility of losing the cover piece or the inconvenience of having to use a screwdriver to unthread one or more threaded screws before being able to access the spare blades.

It would therefore be highly desirable to provide an electrical power tool with a means for retaining one or more spare implements, such as spare saw blades, which can be easily accessed by the operator of the power tool without requiring a separate cover member to be removed from the housing of the power tool.

It would further be highly desirable to provide a power tool having a spare implement storage chamber wherein one or more spare implements such as cutting blades can be stored without significantly modifying the housing of the power tool, and further without adding a significant number of additional component parts to the power tool. In this manner, the overall cost of manufacturing the power tool would not be significantly increased.

It would also be highly desirable to provide an electric power tool with a storage compartment for carrying one or more spare implements such as spare cutting blades, where the storage compartment does not increase the overall size of the housing of the power tool, does not increase significantly the overall weight of the power tool, nor require modification of the placement of the internal components of the power tool within the housing.

It would further be highly desirable to provide an electric power tool having a blade storage compartment for holding one or more spare implements such as spare cutting blades, which can be quickly and easily removed from the storage compartment by simply engaging a single retaining member with one or more fingers, or simply by grasping the non-serrated portion of the blade. This would enable the spare cutting implement to be removed from the housing quickly, easily and without any external tools such as screw drivers, wrenches, etc., and without requiring removal of a separate cover component.

SUMMARY OF THE INVENTION

The present invention relates to an electric power tool having a housing which includes a storage compartment for one or more spare implements. In one preferred embodiment the electric power tool comprises an electrically driven reciprocating saw. The saw includes a housing having a blade storage compartment formed therein and being of dimensions suitable to house one or more spare cutting blades which may be used with the saw when it becomes necessary to change a blade because of breakage or because the blade has become dull.

In one preferred embodiment the housing also includes a retaining member which is pivotally secured to the housing adjacent the storage compartment. The retaining member can be actuated with one or more fingers of the operator and operates to eject one or more spare blades held within the storage compartment when moved from a closed to an open position. In the closed position the retaining member maintains the spare blade(s) in the storage compartment. Accordingly, no separate, independent cover member needs to be removed from the housing to access the spare cutting blade(s) held in the storage compartment.

In the above-described preferred embodiment of the present invention one or more biasing members are disposed within the blade storage compartment. The biasing members engage a portion of the spare cutting blade as the spare cutting blade is inserted into the storage compartment and help to prevent vibration of the spare blade within the storage compartment during use of the power tool.

In an alternative preferred embodiment a pair of biasing members each in the form of a U-shaped retaining clip are provided. A first one of the clips is provided to hold the spare saw blade within the blade storage chamber. The second clip is positioned at the opposite end of the blade storage chamber and prevents the blade from rattling within the chamber. The first clip has a plurality of barbs formed thereon which serve to maintain it within the chamber once slidably inserted therein during manufacture and assembly of the power tool. The second clip is sandwiched between two halves of the tool's housing and is clamped in place during assembly.

The blade storage chamber of the power tool of the present invention does not require alteration of the location of any of the internal components of the power tool, does not increase the overall outer dimensions of the power tool or add to the overall weight of the power tool. Most importantly, however, the blade storage compartment and the retaining member allow quick and easy access without the need for any external tools such as screw drivers, pliers, wrenches, etc., to remove before access can be obtained to the spare cutting blade. Thus, if a cutting blade becomes dulled or breaks during use of the power tool, the operator can remove the spare cutting blade quickly and easily.

In an alternative preferred embodiment the power tool incorporates a retaining member having a housing made from rubber which is disposed within the blade storage compartment. The housing has a pair of arm portions which each have a groove formed therein generally parallel to one another. Each groove has a ball bearing disposed therein. The ball bearings are biased into contact with one another by the arm portions. Since the retaining member is made from rubber, it provides a degree of resiliency to permit the ball bearings to be urged away from each other when a portion of a spare saw blade is inserted between the bearings. A foam-like member secured within the blade storage compartment at an end opposite to the retaining member prevents the opposite end of the spare saw blade from vibrating or rattling within the storage compartment during use of the tool.

BRIEF DESCRIPTION OF THE DRAWINGS

The various advantages of the present invention will become apparent to one skilled in the art by reading the following specification and subjoined claims and by referencing the following drawings in which:

FIG. 1 is a side elevational view of a power tool in accordance with the present invention incorporating a blade storage compartment which is shown in phantom;

FIG. 2 is a bottom view of the power tool of FIG. 1 in accordance with arrow 2 in FIG. 1 showing a spare cutting blade held within the storage compartment;

FIG. 3 is a fragmentary view of the power saw of FIG. 1 with a portion of the housing broken away to illustrate the blade storage compartment;

FIG. 4 is a view of the power tool of FIG. 3 but with the retaining member moved into an open position and showing the spare cutting blade being ejected by the retaining member;

FIG. 5 is a perspective view of the retaining member shown in FIGS. 3 and 4;

FIG. 9 is a side view of a power tool having a blade storage chamber formed therein in accordance with an alternative preferred embodiment of the present invention;

FIG. 10 is a perspective view of a rear retaining clip;

FIG. 11 is a perspective view of a front retaining clip;

FIG. 12 is a perspective view of an alternative preferred form of the rear retaining clip;

FIG. 16 is a perspective view of the retaining member of FIG. 13;

FIG. 17 is an end view of the retaining member of FIG. 16;

FIG. 18 is a plan view of the top of the retaining member of FIG. 17;

FIG. 19 is a cross-sectional view of the retaining member in accordance with section line 19—19 in FIG. 17;

FIG. 20 is a perspective view of a foam-like member used to engage the tip of the saw blade in the blade storage compartment to prevent rattling of the saw blade;

FIG. 21 is a side elevational view of the foam-like member of FIG. 20;

FIG. 22 is a side elevational view of the foam-like member of FIGS. 20 and 21 disposed in a recess in one half of the handle portion;

FIG. 24 is a plan view of a spare saw blade held within the blade storage chamber.

DETAILED DESCRIPTION OF THE PREFERRED EMBODIMENTS

Figure 6:
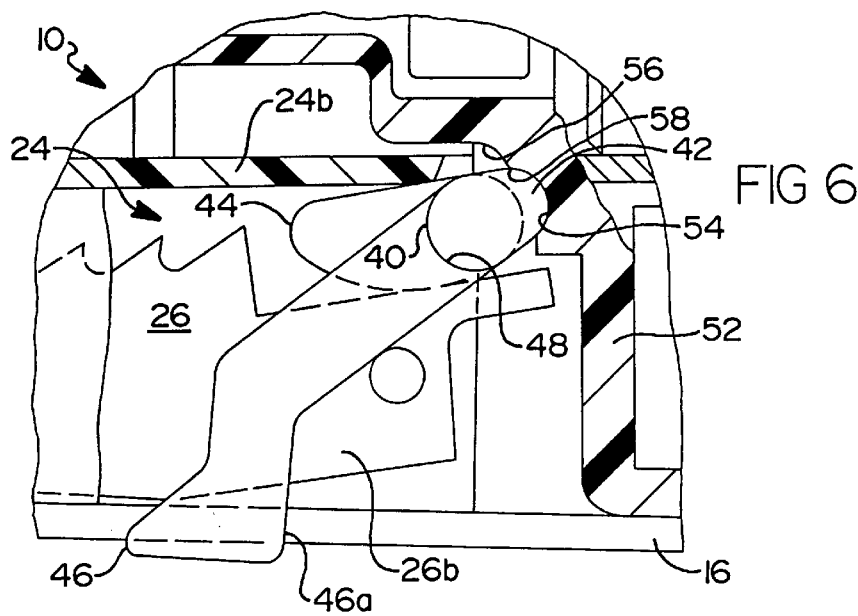
FIG. 6 is an enlarged, partial cross sectional side view of the retaining member in the closed position holding the spare cutting blade within the storage compartment.

Referring to FIG. 1, a power tool 10 in accordance with a preferred embodiment of the present invention is shown. The power tool 10 includes a housing 12 having a handle portion 14, a gear case portion 16, a field case portion 12a and a guide member 18. The handle portion 14 incorporates the conventional clam-shall (i.e., two piece) construction wherein two mating halves are secured together by elements such as threaded screws. The gear case portion 16 and the field case portion 12a each has a tubular one-piece shell. A cutting blade 20 is releasably secured to the blade holder (not shown). The housing 12 includes a blade storage chamber or compartment 24 for holding at least one spare cutting blade 26 therein. The storage chamber 24 comprises an elongated slot which is formed by opposite side walls 24a, a bottom wall 24b (visible in FIGS. 3 and 4), and a partially closed off end portion 24c. An operator actuatable trigger 28 controls the on/off operation of an internally mounted electric motor (not shown) which is used to drive the saw blade 20 in a linear or orbital motion via a suitable gear train (not shown) also disposed within the housing 12.

With reference to FIGS. 1 and 2, operably associated with the blade storage chamber 24 is a retaining member 30. As will be explained more fully in the following paragraphs, the retaining member is pivotally secured to the housing 12. When in the closed position shown in FIG. 2, the retaining member holds the spare cutting blade 26 securely within the storage chamber 24 without the need for any independent cover member for covering the storage chamber 24. While only one spare cutting blade 26 is illustrated as disposed within the storage chamber 24, it will be appreciated that the storage chamber 24 could accommodate more than one spare cutting blade if desired with little or no modification to the retaining member 30 or storage chamber 24. The only requirement is that the storage chamber 24 and retainer be of suitable dimensions to allow the desired number of spare cutting blades to be held therein.

Figure 8:
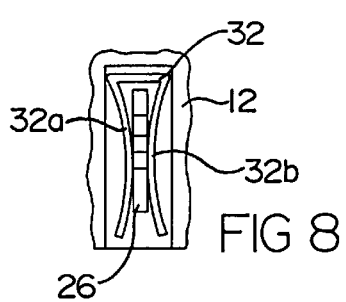
FIG. 8 is a plan view in accordance with section line 8—8 in FIG. 3 illustrating the leaf springs which are used to hold the spare cutting blade to prevent vibration of the blade during use of the power tool.

Referring now to FIG. 3, the blade storage chamber 24 can also be seen to include at least one biasing member 32 for engaging a first end portion 26a of the spare saw blade 26 to prevent the blade from vibrating or rattling within the storage chamber 24. With brief reference to FIG. 8, in the preferred embodiment a U-shaped member having a pair of biasing arms 32a and 32b are disposed in facing relationship with one another for engaging the first end 26a of the spare saw blade 26. Each arm 32a, 32b comprises a leaf spring portion.

Referring now to FIG. 5, the retaining member 30 is shown in greater detail. The retaining member includes a main body portion 36 defining an opening 38. The opening 38 is large enough to receive a second end portion 26b (shown in FIG. 3) of the saw blade 26. A pair of pivot arms 40 extend outwardly of the main body portion 36 and each include a locking cam portion 42. An ejection cam portion 44 is disposed inbetween the locking cam portions 42 and protrudes partially over the opening 38. A shoulder portion 46 also is formed such that it protrudes outwardly slightly from the storage chamber 24 and is thus graspable by one or more fingers of the user, thereby allowing the retaining member 30 to be rotated between closed and opened positions.

Referring now to FIGS. 3 and 6, the operation of the retaining member 30 will be described. Initially, with reference to FIG. 6, the arm portions 40 are pivotally supported within a pair of trunnions 48 formed in the bottom wall portion 24b of the field case portion 12a of the housing 12. In this manner, the retaining member 30 can be rotated about the arm portions 40 between its opened and closed positions. A gear case cover portion 52, which forms one end wall of the blade storage chamber 24 and which also serves to enclose the gear train of the saw 10, is positioned closely adjacent the wall portion 24b of the housing 12. The gear case cover portion 52 includes a first recess 54 and a second recess 56 separated by a shoulder 58. When in the closed position, the locking cams 42 are disposed within recess 54. In this position, the retaining member 30 is not movable without the assistance of an external force applied at the shoulder portion 46 by an operator. Consequently, the spare saw blade 26 is held within the blade storage chamber 24.

Figure 7:
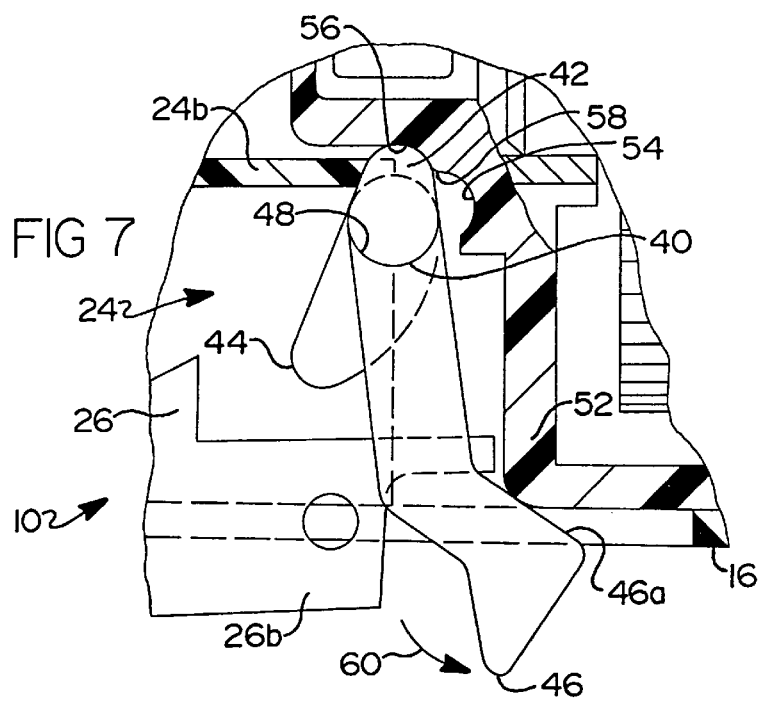
FIG. 7 is a view of the retaining member of FIG. 6 after it has been moved to the open position.

Referring now to FIGS. 4 and 7, the blade 26 is ejected by the operator grasping the shoulder portion 46 with one or more fingers and pulling outwardly in the direction of arrow 60. A small force is needed for the locking cams 42 to clear the shoulder portion 58 and move into the recess 56. As the retaining member 30 is rotated counterclockwise in the drawing of FIG. 7, the ejection cam portion 44 urges the second portion 26b of the spare saw blade 26 downwardly and outwardly of the chamber 24. The second end portion 26b is then removed from the opening 38 and the saw blade 26 can be slid out of the storage chamber.

To load a new spare saw blade 26, the procedure described above is basically reversed. The first end portion 26a of the spare saw blade 26 is slidably inserted into the blade storage chamber 24 such that the first end 26b engages the leaf springs 32a and 32b. At this point the retaining member can be rotated in a clockwise direction from the position shown in FIG. 7 into the position shown in FIG. 6. This action merely involves the operator pushing on a back surface 46a of the retaining member, as shown in FIG. 7, in a clockwise direction which causes the second portion 26b of the blade to be inserted through the opening 38 and lifted up into the blade storage chamber 24. As the locking cam portions 42 are urged over the shoulder portion 58 in the gear case cover portion 52, they engage within the recess 54 in the gear case cover portion 52. At this point the retaining member 30 is held in the position shown in FIG. 6.

Referring now to FIG. 10, there is shown an alternative preferred embodiment of the power tool 10 wherein the housing 12 includes a blade storage chamber 24 incorporating a retaining clip 64 and a stabilizing clip 62. In this embodiment the retaining member 30 is not required. Instead, the spare saw blade 26 is held firmly within the blade storage chamber 24 by the retaining clip 64 at one end, and by the partially closed off end portion 24C of the chamber 24 at the rear of the chamber 24.

Referring further to FIG. 9, a small hemispherically shaped section 24d is molded into the housing 12. This shape allows the user to grasp the first end 26b of the spare blade 26 between two fingers and to pull the blade 26 outwardly of the storage chamber 24.

Referring to FIG. 10, the stabilizing clip 62 is shown in greater detail. The stabilizing clip 62 forms a general U-shape with a body portion 62a having a plurality of barbs 62b formed in the body portion 62a. The barbs 62b allow the clip 62 to be retained in the blade storage chamber 24 after the clip 62 is inserted into the chamber 24. Once inserted, the clip 62 cannot be readily removed from the chamber 24 without disassembly of the housing 12. Alternatively, the clip 62 may be held in place between the two clamshell halves of the handle portion 14, and would therefore be completely enclosed and captured within the housing 12 by suitable internal supporting rib structures during assembly of the tool 10. The stabilizing clip 62 is preferably made from spring steel and serves to prevent the first end portion 26a of the spare saw blade 26 from vibrating or rattling within the blade storage chamber 24.

The retaining clip 64 may be identical to the stabilizing clip 62 in construction, and therefore take the form illustrated in FIG. 10, or may be of a slightly different design to provide a stronger holding force on the spare saw blade 26. With reference to FIG. 11, one such design for the retaining clip 64 is illustrated. This embodiment includes a first U-shaped body portion 66 having a plurality of outwardly turned arm portions 68 and a pair of downwardly extending arm portions 70. The downwardly extending arm portions 70 include end portions 72 which are formed so as to contact each other.

The retaining clip 64 is inserted into the blade storage chamber 24 and the outwardly turned arm portions 68 engage within the chamber 24 to hold the clip therein. The downwardly extending arm portions 70 serve to clamp onto the second end portion 26b of the blade 26 to hold the blade securely within the chamber 24. The spare saw blade 26 is inserted into the blade storage chamber 24 by first inserting the first end portion 26a of the blade 26 into the partially closed off end portion 24C of the chamber 24 and into the stabilizing clip 62. The second end portion 26b of the saw blade 26 is then pushed upwardly into the rear retaining clip 64.

As mentioned above, the clips 62 and 64 can take a wide variety of forms depending upon the construction of the housing 12. One such form is illustrated in FIG. 12. The clip 76 shown in FIG. 12 also forms a generally U-shaped member when viewed from one end and also includes an angled front edge 78. The angled front edge 78 provides additional clearance for internal structure of the housing 12 and further facilitates placement of the clip 76 at a slight angle relative to a horizontal plane, as shown in FIG. 9.

It will be appreciated that the clips 62 and 64 shown in FIG. 9 could be installed in other ways. For example, power tools such as power tool 10 typically have the housing 12 formed with a clam-shell construction. As such, the clips could be inserted into preformed recesses in each half of the housing 12 before the halves are assembled together. In this instance it may not be necessary for the retaining clip 62 and 64 to each include barbs to hold them within the blade storage chamber 24. In either event, the arrangement illustrated in FIG. 9 provides a means for retaining a spare saw blade within a portion of the housing 12 without including cover members or other components which could get lost, misplaced, damaged, etc. Furthermore, the arrangement of FIG. 9 does not require any external tools for the spare saw blade to be removed from the blade storage chamber 24.

The apparatus of the present invention therefore does not require any separate, independent cover members for holding one or more spare saw blades within a blade storage chamber. Thus, there is no risk that the cover member can be lost or misplaced. The storage chamber 24 can easily be made of dimensions to hold more than one spare saw blade if desired. Furthermore, the blade storage chamber 24 and the retaining member 30 do not serve to significantly complicate the manufacture or assembly of the saw 10 or significantly increase the cost of manufacturing same or the overall outer dimensions or overall weight of the saw 10.

Figure 13:
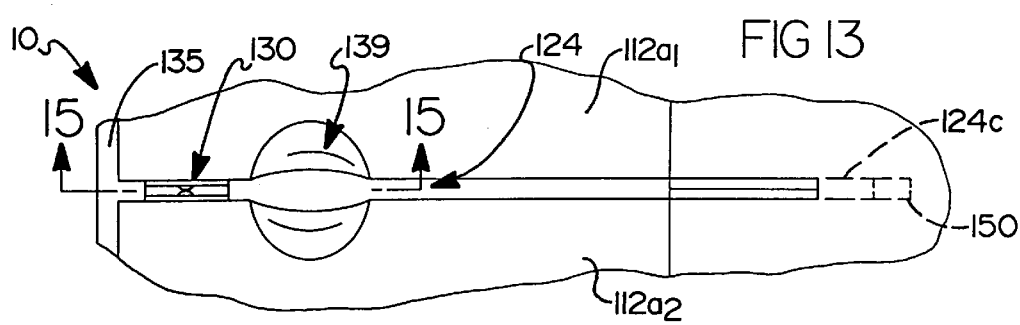
FIG. 13 is plan view of a portion of the power tool of FIG. 1 incorporating a retaining member in accordance with an alternative preferred embodiment of the present invention.
Figure 14:
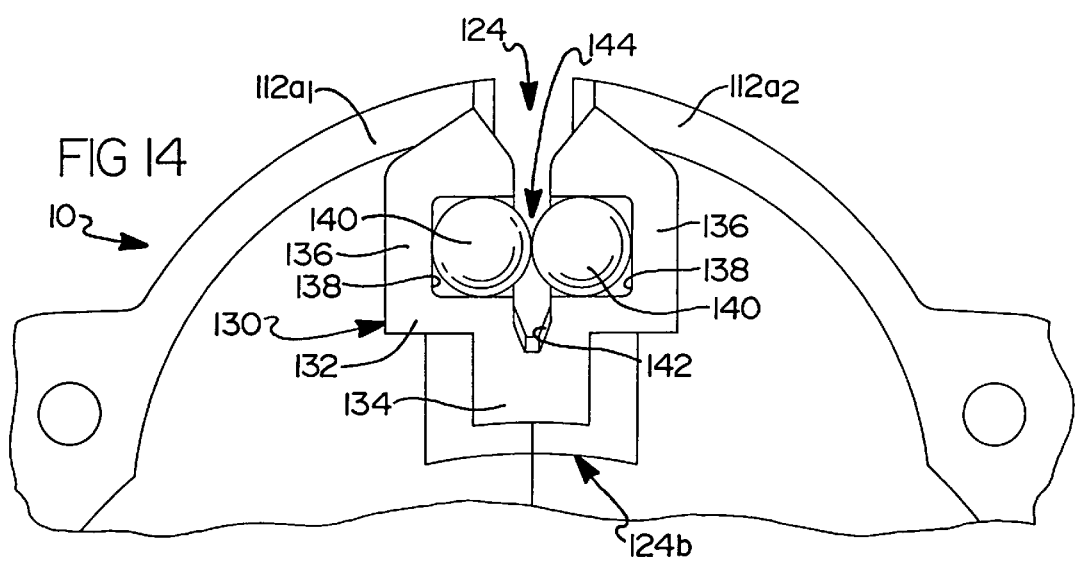
FIG. 14 is an end elevational view of the retaining member of FIG. 13 disposed within a portion of the field case housing of the power tool, in accordance with directional line 14—14 in FIG. 13.
Figure 15:
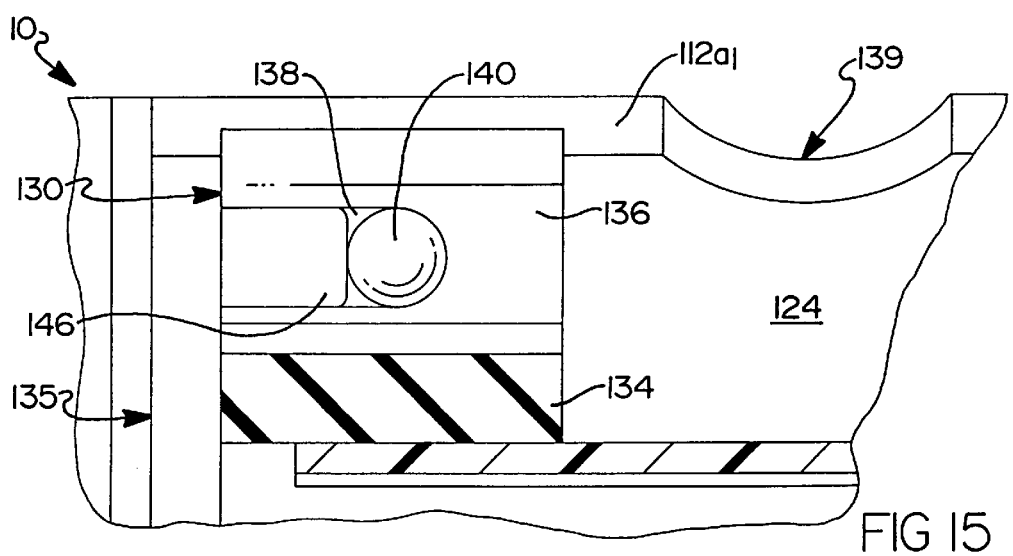
FIG. 15 is a partial cross sectional view of a portion of the power tool shown in FIG. 13 in accordance with section line 15—15 in FIG. 13.
Figure 23:
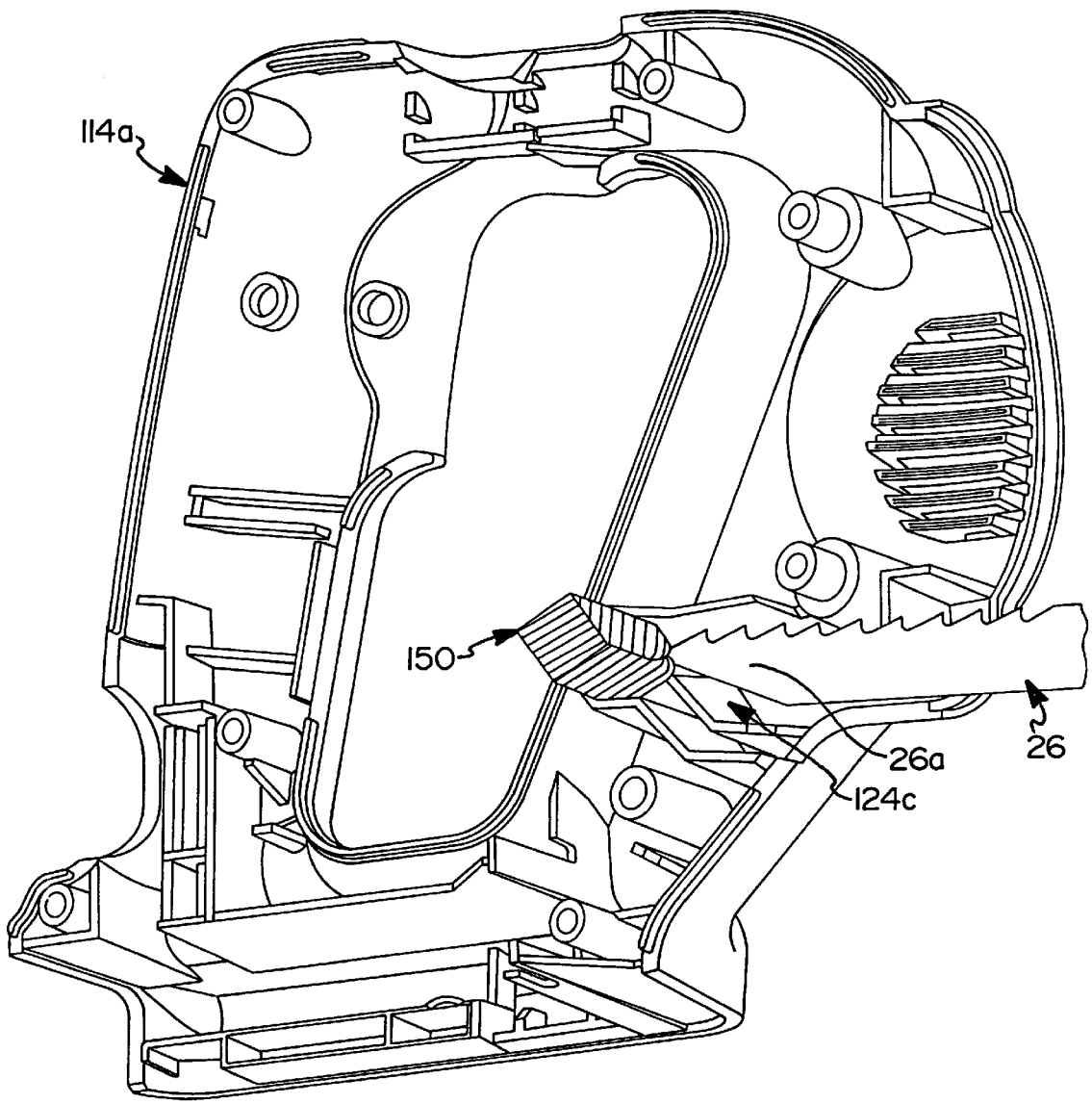
FIG. 23 is a perspective view of the handle portion of FIG. 22 showing a tip portion of the spare saw blade engaging the foam-like member.

Referring now to FIGS. 13—15, a retaining member 130 in accordance with an alternative preferred embodiment of the present invention is shown. The retaining member 130 is inserted into the blade storage compartment 124 by sliding it into a channel formed by a generally U-shaped bottom wall 124b. The bottom wall 124b, in combination with field case housing portions 112$a_1$ and 112$a_2$, capture the retaining member 130 in the blade storage chamber 124 during assembly of the power tool 10. End wall 131 prevents the retaining member from sliding inwardly along the blade storage chamber 124. A gear case cover 135 prevents the retaining member 130 from sliding completely out of the blade storage chamber 124. Thus, once the power tool 10 is fully assembled, the retaining member 130 is held immovably within the blade storage chamber 124.

With further reference to FIG. 13, a recess 124c in formed in the handle portion 14 for accepting the tip or first end 26a of the saw blade 26. Within the recess 124c is secured a sponge or foam-like member 150. The foam-like member 150 serves to engage the very tip of the spare saw blade 26 to prevent same from rattling within the storage chamber 124 during use of the power tool 10. This feature will be discussed in greater detail in the following paragraphs.

Referring now to FIGS. 16—19, the retaining member 130 is shown in greater detail. The retaining member 130 includes a single piece housing 132 manufactured from rubber. The housing 132 includes a base portion 134 and a pair of arm portions 136 each having parallel, facing cutouts or grooves 138. Each of the grooves 138 contains a ball bearing 140. Each ball bearing 140 has a diameter approximately equal to the height of its associated groove 138 such that it fits snugly within its groove. The base portion 134 has an elongated notch or secondary groove 142 running preferably the full length thereof. The arm portions 136 define a slot 144 therebetween. When the retaining member 130 is assembled in the power tool 10, the ball bearings 140 are held in contact with one another. Since the retaining member housing 132 is made from rubber, it is slightly resilient and biases the ball bearings 140 toward each other. It will be appreciated, however, that a semispherical pocket or recess having a radius sufficiently large to hold the ball bearing 140 therein could be employed in lieu of groove 138. Also, the retaining member housing 132 could be manufactured from other materials besides rubber, such as spring steel, providing that the arm portions 136 have a degree of resiliency which tends to bias the ball bearings 140 toward each other. Manufacturing the retaining member housing 132 from rubber, however, eliminates the criticality of the dimensions and the variability in the resiliency of the arm portions 136 that would be a concern if same was manufactured from spring steel.

With further brief reference to FIG. 15, the gear case cover 135 has a pair of arm portions 146 (only one being visible in FIG. 15) which project into the grooves 142. The arm portions 146 abut the ball bearings 140 and function to hold the ball bearings in the grooves 138 such that same are not able to roll longitudinally in the grooves out of contact with one another after the tool 10 is assembled.

Referring now to FIGS. 20–23, the foam-like member 150 is shown in greater detail. The foam-like member 150 comprises a rectangular, compressible, closed cell sponge which is secured within the recess 124c in the handle portion 114 by a suitable adhesive 152 disposed on at least one surface of the member 150. The foam-like member 150 may be made from a variety of compressible materials, but one such material that functions particularly well is SCE 42, available from Jamak Fabrication, Inc., Weatherford, Tex. The foam-like member 150 engages the first end or tip 26a of the saw blade 26 to prevent same from rattling or vibrating inside the recess 124c. The foam-like member 150 is shown adhesively secured within one portion 114a of the handle 114 in FIG. 22. The foam-like member 150 is shown engaging the first end 26a of the spare saw blade 26 in FIG. 23.

Referring to FIG. 24, the spare saw blade 26 is inserted into the blade storage chamber 124 by inserting the first end 26a thereof into the recess 124c of the chamber 124 such that it engages the foam-like member 150. The second end 26b is then urged into the retaining member 130. The second end 26b is captured between the ball bearings 140 and held securely with the chamber 124. When the spare blade 26 needs to be removed, a user simply grasps an intermediate portion of the blade 26 at a recessed area 139 of the housing portions 112$a_1$, and 112$a_2$ and pulls the second end 26b out from the retaining member 130, and then slides the entire blade out of the blade storage chamber 124. The frictional force of the ball bearings 140 is enough to securely hold the spare saw blade 26 in the blade storage chamber 124 in spite of vibration experienced during use of the power tool 10, but still allows the blade 26 to be easily removed by the user when it is needed. Advantageously, this embodiment does not require any clip or other component at the opposite end of the blade storage chamber 124. The first end 26*a* of the blade 26 is simply held between suitably spaced apart ribs or internal wall portions forming part of the field case housing portions 112*a*1 and 112*a*2.

It will be appreciated that the retaining member 130 could incorporate a number of modifications if desired. One such modification could be the use of only a single ball bearing and a flat, integral rubber sidewall facing the one ball bearing. The resiliency of the rubber sidewall would cooperate with the single ball bearing to hold the spare saw blade inside the storage chamber 124.

Another modification could be the use of at least one permanent magnet that is molded within one sidewall of the rubber retaining member 130, and which is in facing relationship with a flat sidewall portion of the retaining member. The permanent magnet could be used in place of the ball bearings to magnetically retain the spare saw blade 26 in the blade storage chamber 124.

It will also be appreciated that while the retaining member 130 has been shown and described as being manufactured from rubber, other resilient materials could be used if desired with little or no structural modifications to the retaining member. For example, the retaining clip could potentially be molded as a single piece component from plastic or spring steel. The plastic could provide the slight degree of resiliency needed to allow the ball bearings 140 to be urged apart from one another as the spare saw blade 26 is inserted between the ball bearings.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electrically powered saw adapted for use with a removable, replaceable saw blade, said saw comprising:
   a housing:
   a blade storage chamber formed within said housing suitable for holding a spare saw blade therein;
   a retaining member disposed within said blade storage chamber, said retaining member having a slot for receiving and retaining said spare saw blade therein, wherein said spare saw blade can be readily removed from said retaining member when needed by an operator of said saw without any external tools; and
   said retaining member being directly accessible to permit insertion of said spare saw blade therein without first requiring removal of any component of said housing or said retaining member from said housing.

2. The saw of claim 1, wherein said blade storage chamber within said housing comprises an elongated recess formed in said housing.

3. The saw of claim 1, wherein said retaining member comprises a single piece member comprised of a resilient material forming a slot for receiving a portion of said spare saw blade and holding said portion of said spare saw blade releasably therein.

4. The saw of claim 1, wherein said retaining member is comprised of rubber and further includes at least one channel formed adjacent said slot; and
   wherein said channel includes a ball bearing for engaging said portion of said spare saw blade.

5. The saw of claim 1, wherein said retaining member is comprised of rubber and further includes a pair of opposing grooves formed adjacent said slot; and
   wherein each said groove includes a ball bearing disposed therein, said ball bearings engaging each other when said retaining member is assembled into said saw and being capable of being urged away from each other as said portion of said spare saw blade is inserted therebetween into said slot.

6. The saw of claim 1, further comprising a compressible member disposed in an end of said blade storage chamber so as to be spaced apart from said retaining member, for engaging a tip portion of said spare saw blade to prevent rattling of said blade.

7. The saw of claim 4, wherein said saw further comprises a gear case housing member having at least one arm portion projecting into said groove in said retaining member to hold said ball bearing within said groove once said saw is assembled.

8. An electrically powered saw adapted for use with a removable, replaceable saw blade, said saw comprising:
   a housing:
   a blade storage chamber formed within said housing suitable for holding a spare saw blade therein; and
   a retaining member associated with said storage chamber for retaining said spare saw blade within said storage chamber, wherein said spare saw blade can be readily removed from said blade storage chamber when needed by an operator of said saw without any external tools;
   said retaining member having a pair of arm portions defining a slot therebetween into which said spare saw blade is inserted, at least one of said arm portions including a groove within which is disposed a ball bearing, said ball bearing operating to engage a portion of said spare saw blade and to retain said spare saw blade in said slot.

9. The saw of claim 8, wherein each of said arm portions of said retaining member include a groove formed therein, with each of said grooves including a ball bearing disposed therein.

10. The saw of claim 8, wherein said retaining member is comprised of rubber.

11. The saw of claim 9, wherein said grooves are aligned with each other such that said ball bearings oppose and contact each other when said spare saw blade is not inserted into said retaining member.

12. The saw of claim 8, further comprising a compressible member disposed in said blade storage chamber for engaging a tip portion of said spare saw blade to prevent rattling of said saw blade during use of said saw.

13. An electrically powered tool adapted for use with a removable, replaceable tool element, said tool comprising:
   a housing:
   a tool element storage chamber formed within said housing suitable for holding a spare tool element therein; and
   a retaining member associated with said storage chamber for retaining said spare tool element within said storage chamber, wherein said spare tool element can be readily removed from said storage chamber when needed by an operator of said tool without any external tools; and said retaining member including a pair of arm portions forming a slot therebetween into which said spare tool element can be inserted, at least one of said arm portions including a ball bearing, said ball bearing engaging a portion of said spare tool element when said element is inserted into said retaining member.

14. The tool of claim 13, wherein each said arm portion of said retaining member includes a ball bearing, and wherein said ball bearings are arranged so as to be biased into contact with each other when said spare tool element is not inserted into said slot.

15. The tool of claim 13, wherein said retaining member is comprised of rubber.

16. The tool of claim 13, wherein each said arm portion includes a groove formed therein for supporting its associated said ball bearing.

17. An electrically powered saw adapted for use with a removable, replaceable saw blade, said saw comprising:
   a housing:
      a blade storage chamber formed within said housing suitable for holding a spare saw blade therein;
      a rubber retaining member associated with said blade storage chamber for retaining said spare saw blade within said storage chamber, wherein said spare saw blade can be readily removed from said blade storage chamber when needed by an operator of said saw without any external tools; and
      said rubber retaining member having a pair of arm portions defining a slot therebetween into which said spare saw blade is inserted, each of said arm portions including a groove within which is disposed a ball bearing, said grooves being arranged such that said ball bearings face and are biased into contact with one another when said spare saw blade is not inserted into said slot, and operating to engage a portion of said spare saw blade and to retain said portion of spare saw blade in said slot when said portion is inserted therein.

18. The saw of claim 17, wherein said retaining member comprises a single piece, integrally formed rubber member.

19. The saw of claim 17, wherein said saw further comprises a compressible member disposed in said storage chamber for engaging a tip portion of said spare saw blade spare saw to prevent rattling of said blade within said storage chamber during use of said saw.

20. A reciprocating saw comprising:
   an elongated housing having front and rear ends;
   the housing comprising a gear case portion forming the front end of the tool, a handle portion forming the rear end of the tool and a motor portion intermediate the gear case portion and the handle portion;
   a blade storage chamber formed in the housing for receiving a saw blade for the saw and a retainer disposed in the chamber and engageable with the blade in the chamber for retaining the blade in the chamber; and
   said retaining member being directly accessible to permit insertion of said saw blade therein without first requiring removal of any component of said housing or said retaining member from said housing.

21. The saw of claim 20, wherein the retainer includes a resilient material forming a pair of opposing arms, the opposing arms forming a slot therebetween for receiving a portion of the saw blade.

22. The saw of claim 21, wherein each opposing arm includes a groove, each of the grooves including a ball bearing, the ball bearings being biased into contact with each other and being operable to grasp the portion of the saw blade to retain the saw blade within the chamber.

23. The saw of claim 20, further comprising a compressible member disposed in the chamber at one end thereof for engaging a tip portion of the saw blade when the saw blade is inserted into the chamber, to thereby assist in retaining the saw blade within the chamber.

* * * * *

UNITED STATES PATENT AND TRADEMARK OFFICE
CERTIFICATE OF CORRECTION

PATENT NO.    : 6,189,217 B1
DATED         : February 20, 2001
INVENTOR(S)   : Jason R. Melvin et al.

It is certified that error appears in the above-identified patent and that said Letters Patent is hereby corrected as shown below:

Column 10,
Lines 28-29, "suit able" should be -- suitable --

Column 12,
Line 6, "spare saw to prevent rattling of said" should be -- to prevent rattling of said spare saw --

Signed and Sealed this

Fourth Day of March, 2003

JAMES E. ROGAN
*Director of the United States Patent and Trademark Office*